United States Patent
Bai et al.

(10) Patent No.: US 10,040,216 B2
(45) Date of Patent: Aug. 7, 2018

(54) POWDER PARTICLE LAYERWISE THREE-DIMENSIONAL PRINTING PROCESS

(71) Applicant: The ExOne Company, North Huntingdon, PA (US)

(72) Inventors: John A. Bai, Roanoke, VA (US); Kevin D. Creehan, Sammamish, WA (US); Howard A. Kuhn, Butler, PA (US)

(73) Assignee: The ExOne Company, North Huntingdon, PA (US)

( * ) Notice: Subject to any disclaimer, the term of this patent is extended or adjusted under 35 U.S.C. 154(b) by 965 days.

(21) Appl. No.: 14/025,343

(22) Filed: Sep. 12, 2013

(65) Prior Publication Data

US 2015/0069649 A1   Mar. 12, 2015

Related U.S. Application Data

(63) Continuation of application No. 11/881,201, filed on Jul. 26, 2007, now abandoned.
(Continued)

(51) Int. Cl.
*B28B 1/00* (2006.01)
*B29C 67/00* (2017.01)
(Continued)

(52) U.S. Cl.
CPC .............. *B28B 1/001* (2013.01); *B22F 3/008* (2013.01); *B29C 64/165* (2017.08); *B33Y 10/00* (2014.12);
(Continued)

(58) Field of Classification Search
CPC ............ B29C 67/0081; B29K 2039/06; B29K 2303/04; B29K 2031/04; B29K 2303/06;
(Continued)

(56) References Cited

U.S. PATENT DOCUMENTS 5,204,055 A * 4/1993 Sachs ...................... B05C 19/04
                                                264/113
5,340,656 A * 8/1994 Sachs ...................... B05C 19/04
                                                347/1
(Continued)

FOREIGN PATENT DOCUMENTS

WO    WO 2006049619 A1 *  5/2006
WO    WO 2009017648 A1 *  2/2009  ............. C09D 11/30

OTHER PUBLICATIONS

Crane, "Improving accuracy of powder-based SFF processes by metal deposition from a nanoparticle dispersion", Rapid Prototyping Journal, 2006, 12.5, pp. 261-272.*
(Continued)

*Primary Examiner* — Robert J Grun
*Assistant Examiner* — Jerzi H Moreno Hernandez
(74) *Attorney, Agent, or Firm* — Thomas Lizzi

(57) ABSTRACT

Three-dimensional printing processes are disclosed which utilize printable fluids comprising a carrier fluid, a polymeric binder, and nanoparticles. The three-dimensional printing processes are useful for making articles from a build material powder, e.g., a ceramic, metal, metal alloy, or intermetallic powder. The nanoparticles enable low temperature interparticle bonding of the build material powder particles, e.g., by forming bridging bonds between adjacent powder particles, and/or increasing the interparticle friction between the build material powder particles to enhance the structural strength of the as-built article during a thermal treatment over at least a part of the temperature range which has as its low end the temperature at which the structural strength due to the binder becomes insubstantial and as its high end the temperature at which the structural strength due to interparticle sintering of the build material powder
(Continued)

becomes substantial, i.e., the article's debile temperature range. Green density improvements are achievable.

14 Claims, 3 Drawing Sheets

Related U.S. Application Data

(60) Provisional application No. 60/922,042, filed on Apr. 4, 2007.

(51) Int. Cl.
| | | |
|---|---|---|
| B33Y 10/00 | (2015.01) | |
| B33Y 30/00 | (2015.01) | |
| C04B 35/01 | (2006.01) | |
| C04B 35/053 | (2006.01) | |
| C04B 35/111 | (2006.01) | |
| C04B 35/14 | (2006.01) | |
| C04B 35/26 | (2006.01) | |
| C04B 35/453 | (2006.01) | |
| C04B 35/457 | (2006.01) | |
| C04B 35/46 | (2006.01) | |
| C04B 35/486 | (2006.01) | |
| C04B 35/505 | (2006.01) | |
| C04B 35/528 | (2006.01) | |
| C04B 35/56 | (2006.01) | |
| C04B 35/565 | (2006.01) | |
| C04B 35/581 | (2006.01) | |
| C04B 35/584 | (2006.01) | |
| C04B 35/632 | (2006.01) | |
| C04B 35/634 | (2006.01) | |
| B22F 3/00 | (2006.01) | |
| B29C 64/165 | (2017.01) | |
| B29K 105/00 | (2006.01) | |
| B29K 31/00 | (2006.01) | |
| B29K 303/04 | (2006.01) | |
| B29K 303/06 | (2006.01) | |
| B22F 1/00 | (2006.01) | |

(52) U.S. Cl.
CPC ............. *B33Y 30/00* (2014.12); *C04B 35/01* (2013.01); *C04B 35/053* (2013.01); *C04B 35/111* (2013.01); *C04B 35/14* (2013.01); *C04B 35/26* (2013.01); *C04B 35/453* (2013.01); *C04B 35/457* (2013.01); *C04B 35/46* (2013.01); *C04B 35/486* (2013.01); *C04B 35/505* (2013.01); *C04B 35/528* (2013.01); *C04B 35/565* (2013.01); *C04B 35/5626* (2013.01); *C04B 35/581* (2013.01); *C04B 35/584* (2013.01); *C04B 35/632* (2013.01); *C04B 35/634* (2013.01); *B22F 1/0018* (2013.01); *B22F 2998/10* (2013.01); *B29K 2031/04* (2013.01); *B29K 2039/06* (2013.01); *B29K 2105/0005* (2013.01); *B29K 2105/251* (2013.01); *B29K 2303/04* (2013.01); *B29K 2303/06* (2013.01); *C04B 2235/6026* (2013.01)

(58) Field of Classification Search
CPC ...... B29K 2105/251; B29K 2105/0005; B33Y 10/00; B33Y 30/00; B28B 1/001
See application file for complete search history.

(56) References Cited

U.S. PATENT DOCUMENTS

| | | | | |
|---|---|---|---|---|
| 5,387,380 | A * | 2/1995 | Cima | B05C 19/04 264/109 |
| 5,738,817 | A * | 4/1998 | Danforth | B29C 41/36 264/255 |
| 5,997,795 | A * | 12/1999 | Danforth | B29C 33/3842 264/219 |
| 6,423,255 | B1 * | 7/2002 | Hoechsmann | B29C 67/0081 264/113 |
| 2004/0145088 | A1 * | 7/2004 | Patel | B29C 41/003 264/463 |
| 2004/0262582 | A1 * | 12/2004 | Kirkor | B82Y 10/00 252/500 |
| 2005/0215664 | A1 * | 9/2005 | Elwakil | B32B 17/10247 523/160 |
| 2005/0215689 | A1 * | 9/2005 | Garbar | B82Y 30/00 524/440 |
| 2006/0189113 | A1 * | 8/2006 | Vanheusden | B22F 1/0018 438/597 |
| 2006/0251535 | A1 * | 11/2006 | Pfeifer | B22F 1/02 419/36 |
| 2006/0251826 | A1 * | 11/2006 | Pfeifer | B01J 2/006 427/558 |
| 2008/0241404 | A1 * | 10/2008 | Allaman | B29C 67/0081 427/333 |
| 2009/0007724 | A1 * | 1/2009 | Liu | B22F 3/008 75/230 |

OTHER PUBLICATIONS

EPO, International search report and International written opinion, dated Apr. 2005, all pages.*
Crane, Strengthening porous metal skeletons by metal deposition from a nanoparticle dispersion, 2005, Massachusetts Institute of Technology, Doctoral dissertion; https://dspace.mit.edu/handle/1721.1/32385.*

* cited by examiner

COMPARISON SPECIMENS    SPECIMENS PER PRESENT INVENTION

COMPARISON SPECIMEN

SPECIMEN PER PRESENT INVENTION

POWDER PARTICLE LAYERWISE THREE-DIMENSIONAL PRINTING PROCESS

CROSS-REFERENCE TO RELATED APPLICATIONS

The present application is claims the priority of and is a continuation of application Ser. No. 11/881,201, which was filed Jul. 26, 2007, and is incorporated herein by reference in its entirety. The present application also claims the priority of provisional application Ser. No. 60/922,042, which was filed Apr. 4, 2007, and is incorporated herein by reference in its entirety.

FIELD OF THE INVENTION

The present invention relates to ink-jet printable suspensions that are useful in the three-dimensional printing process for making articles from a powder build material. The present invention also relates to articles made using such suspensions and methods of using such suspensions.

BACKGROUND OF THE INVENTION

The three-dimensional printing process is a solid free-form fabrication process, i.e., a process which constructs a three-dimensional article on a layer-by-layer basis from a build material using a computer representation of the article. The build material is a powder, for example without limitation, metal powders and ceramic powders. A layer of the build material is spread across a vertically movable platform. A solution containing a binder is ink-jet printed onto the build material layer in the pattern of the first of a series of cross-sectional slices of the article that is to be built. (A binder is a substance that acts to bind the powder particles together after the solvent portion of the applied binder solution has evaporated.) The platform is then lowered an amount that is equal to a layer-thickness. Another layer of build material is applied over the first layer and binder solution is ink-jet printed onto the second layer in the pattern of the second cross-sectional layer of the series. This sequence of spread-and-print is continued until the article is constructed. More than one article can be made at a time. Eventually, the article is removed from the surrounding bed of unbonded build material and any unbonded build material that is retained in internal passages of the article is removed. The three-dimensional printing process is described in more detail in U.S. Pat. No. 6,036,777 to Sachs, issued Mar. 14, 2000.

Post-processing operations are typically employed to enhance the physical properties of an article formed by the three-dimensional printing process. Typically, powder articles constructed of such build materials are heated to cause the powder particles to sinter together and then the sintered articles are cooled. The sintering effectively unites the individual powder particles together into a single, cohesive unit. As a result, the sintered article obtains substantial additional structural strength. Additional operations, for example without limitation, infiltration or heat treating, may be employed to further modify the structural strength of the sintered article.

Prior to the sintering heat treatment, the structural strength of the built article is primarily provided by the binder that was ink-jet printed onto the build material, although minor contributions to the structural strength may be made by other factors such as, for example without limitation, interparticle friction and the mechanical interlocking of powder particles. A curing step may be used to strengthen the binder. Usually, the binder provides the article with sufficient structural strength to permit the article to be removed from the bed of unbonded building material and handled for further processing.

During the sintering heat treatment, the structural strength of the article changes as the temperature increases and the binder is thermally removed from the article. Generally, the thermal removal results from the volatilization of the binder or of its individual components or of some degradation or decomposition product that is formed from the binder as the heating progresses in the heat treatment environment. As the binder is removed, degrades, or decomposes, its contribution to the structural strength of the article eventually decreases, although in cases wherein the binder melts as it is heated, its contribution to the structural strength may temporarily increase as the surface tension of the liquefied binder forms capillary force bonding between the powder particles. Eventually, however, the structural strength decreases again as the binder removal continues and the capillary force bonds disappear. In all cases, a temperature is reached at which binder removal has progressed to the point whereat its contribution to the structural strength of the article becomes insubstantial. Unless interparticle sintering has begun by this temperature, the structural strength of the article is dependent on the restraint provided by such phenomena as interparticle friction and mechanical interlocking of powder particles. In some cases, decomposition products of the binder, e.g., a carbon residue, may add to the interparticle friction or react with the powder particles to contribute to the structural strength of the article. The article's shape may warp if the article's structural strength at any time during the process becomes insufficient to balance the body forces on the article, for example without limitation, gravity and surface tension.

Unfortunately, for some build material powders or article shapes, it is difficult or impossible to obtain sufficient structural strength to avoid shape distortion while the article is being heated up to the sintering temperature. This is especially true for spherical powders because their smooth, unfeatured surfaces minimize the contributions to an article's structural strength from interparticle friction and interlocking. It is also especially true where the article is thin, has high aspect ratios, or has unsupported overhanging features.

It is therefore an object of the present invention to provide a means for increasing the structural strength of a three-dimensional printed article during the heating portion of the sintering cycle.

As described below, the present invention fulfils this object through a combination of inkjet printable nanoparticle suspensions and three-dimensional printing using a powder build material. Until now, inkjet printable nanoparticle suspensions have been used for printing only on planar substrates or onto previously deposited layers which were initially deposited on planar substrates. For example, Sawyer B. Fuller et al., *Ink-Jet Printed Nanoparticle Microelectromechanical Systems*, Journal of Microelectromechanical Systems, Vol. 11, No. 1, February 2002, 54-60, teaches inkjet depositing, in a raster-like fashion, multiple layers of 10% by weight metal colloidal nanoparticles suspended in α-terpineol "inks" onto horizontal, flat substrates, which were heated to 100 to 300° C. to flash-evaporate the printed droplets on contact and to make two- and three-dimensional articles up to 400 dried droplet layers thick which were further heat treated to sinter the nanoparticles together into a functional microelectromechanical ("MEMS") device. The nanoparticles used were gold and silver particles 5 to 7 nanometers in size. The structures built were electrically and mechanically functional MEMS devices. Fuller et al. found that using an unheated substrate caused problems due to uneven wetting. In another example, John B. Szczech et al., *Fine-Line Conductor Manufacturing Using Drop-On-Demand PZT Printing Technology*, IEEE Transactions On Electronics Packaging Manufacturing, Vol. 25, No. 1. January 2002, 26-33, teaches inkjet printing nanoparticle fluid suspensions of 1-10 nanometer 30% gold-plus-5% copper or 30% silver-plus-5% copper (by weight) particulates in a toluene carrier fluid in patterns onto horizontal, flat substrates and sintering them at 300° C. to fabricate fine-line electrical circuit interconnect conductors. And in another example, Hsien-Hsueh Lee et al., *Inkjet Printing Of Nano-sized Silver Colloids*, Nanotechnology, Vol. 16 (2005) 2436-2441, teaches inkjet printing lines of 5 to 35% (by weight) silver nanoparticles 50 nanometer in size dispersed in a 50/50 weight percent diethylene glycol and water cosolvent carrier vehicle onto horizontal glass slides and then sintering the deposited lines to produce electrical conductors.

SUMMARY OF THE INVENTION

The present invention provides inkjet printable nanoparticle suspensions that are useful in the three-dimensional printing process for making articles from a build material powder. The inventive suspensions contain nanoparticles of a material that enables low temperature interparticle bonding of the build material powder particles, e.g., by forming a bridging bond between adjacent powder particles, and/or increasing the interparticle friction between the build material powder particles so as to enhance the structural strength of the as-built article during a thermal treatment over at least a part of the temperature range which has as its low end the temperature at which the structural strength due to the binder becomes insubstantial and as its high end the temperature at which the structural strength due to interparticle sintering of the build material powder becomes substantial. For conciseness of expression, the term "debile temperature range" is sometimes used herein and in the appended claims to refer to this temperature range.

As used herein and in the appended claims the phrase "the temperature at which the structural strength due to the binder becomes insubstantial" is to be construed as meaning the temperature at which the contribution to the overall structural strength of the article attributable to the presence of the binder is less than the combined contribution made by other factors, such as, without limitation, interparticle friction, mechanical interlocking of powder particles, and interparticle sintering. It is to be understood that the temperature at which the structural strength due to the binder becomes insubstantial is to be determined on an article made in the same manner and with the same build powder, but without the use of the nanoparticles of the present invention.

As used herein and in the appended claims the phrase "temperature at which the structural strength due to interparticle sintering of the build material powder becomes substantial" is to be construed as meaning the temperature at which the contribution to the overall structural strength of the article that is attributable to the sintering together of the build material powder particles is greater than the combined contribution made by other factors, such as, without limitation, interparticle friction, and the mechanical interlocking of powder particles. As used herein and in the appended claims, the term "sintering together" includes both solid phase sintering and liquid phase sintering, the latter including interparticle adhesion due to the surface tension forces of liquid phases derived from the build material powder. It is to be understood that the temperature at which the contribution to the overall structural strength of the article due to the interparticle sintering is greater than the combined contribution made by other factors is to be determined on an article made in the same manner and with the same build powder, but without the use of the nanoparticles of the present invention.

The suspensions of the present invention are printable from inkjet print heads. The term "printable" is to be construed herein and in the appended claims as meaning that the fluid or suspension to which it refers may be expelled from an inkjet print head without clogging the print head for a period of time which is of practically reasonable duration for the printing operation for which the print head is being employed.

The present invention also relates to the articles made by using the nanoparticle suspensions in the three dimensional printing process. The present invention further relates to methods of using the nanoparticle suspensions to construct articles by a three-dimensional printing process.

In embodiments of the present invention, the nanoparticle suspensions contain nanoparticles of a ceramic, metal, metal alloy, or intermetallic compound that will diffusion bond to the build material powder particles below or in the relevant debile temperature range.

Several benefits are derivable from the present invention. The structural strength increase provided by nanoparticle-enhanced interparticle bonding and/or increased interparticle friction due to nanoparticle-to-build material powder bonding helps to prevent the article from sagging or warping in the debile temperature range portion of the sintering heat treatment. This is especially beneficial for large parts and for those which have thin or unsupported sections. The structural strength increase provided by the invention may also improve the sharpness of the geometric features of the sintered article thereby yielding, for example without limitation, sharper corners and edges.

Some embodiments of the present invention are particularly beneficial in material systems in which residuals from the binder, e.g., carbon, are not effective in promoting low temperature bonding at interparticle contact points. The high mobility of the surface atoms and small through-body diffusion distances of the nanoparticles enables them to act as low temperature atom sources that promote the bonding together of the build powder particles. Through enhanced low temperature interparticle bonding, the present invention may promote improved sintering of the article and thereby lead to improved mechanical properties in the sintered article, such as higher tensile strength and increased ductility.

The present invention also permits the development of material compositional variations within the built article. Some embodiments of the present invention accomplish this by using multiple print heads, each using a suspension that differs from the others in nanoparticle type and/or concentration, to deposit differing levels and/or types of nanoparticles in selected locations of the article as it is built.

Furthermore, the present invention permits more latitude in tailoring the binder for the build powder since the strengthening due to the nanoparticles lessens the reliance on the binder, in either solid or liquid form, for structural strength during the heating cycle. Therefore, the present invention permits the use of binders which burn out at lower temperatures and with less residues than may otherwise be practical for the particular build material being used to make the article.

The present invention also provides for higher green densities because the nanoparticles fill in the interstices between the larger particles of the printed powder. The ability of the invention to provide higher green densities is advantageous because higher green densities generally lead to improved sintering quality, e.g., higher sintered density.

Another advantage provided by some embodiments of the present invention is improved handling robustness of the green compacts in some cases in which a separate binder curing heat treatment is used prior to submitting the green compacts to a sintering heat treatment. In such embodiments, the characteristics of the nanoparticles are selected so that the nanoparticles are able to form interparticle bonds between the build powder particles in the temperature range in which the binder curing heat treatment is conducted. These interparticle bonds strengthen the green compact so that the green compact is less fragile during pre-sinter cycle handling operations than it would have been had the nanoparticle suspension not been used during the three-dimensional printing of the green article.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention.

PREFERRED EMBODIMENTS OF THE INVENTION

Figure 1:
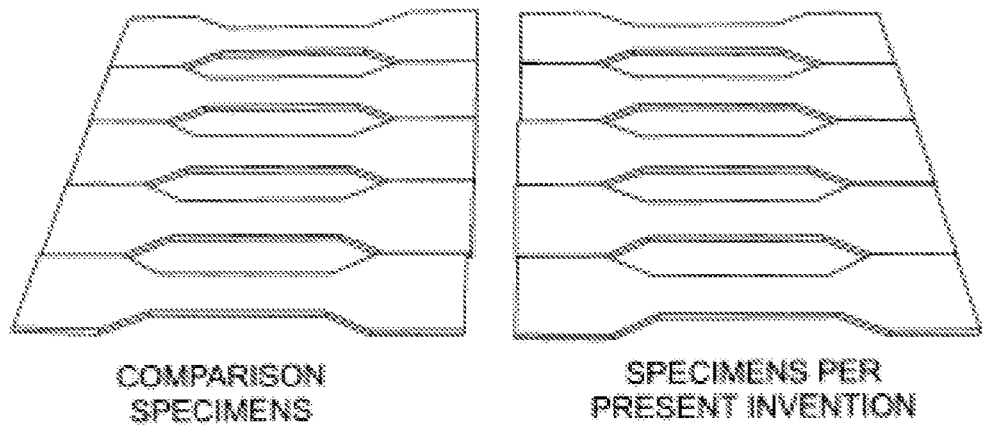
FIG. 1 is a photograph showing specimens discussed in the Examples made by the three-dimensional printing process, which are in the as-printed state and have a printed thickness of 1.0 millimeters.

In this section, some preferred embodiments of the present invention are described in detail sufficient for one skilled in the art to practice the present invention without undue experimentation. It is to be understood, however, that the fact that a limited number of preferred embodiments are described herein does not in any way limit the scope of the present invention as set forth in the appended claims.

The ink-jet printable suspensions of the present invention contain nanoparticles that promote low temperature interparticle bonding of the build material powder particles and/or increasing the interparticle friction between the build material powder particles. The nanoparticles are to be of a material that will bond to the build material powder particles at temperatures which are in or below the relevant debile temperature range. For example, without limitation, the nanoparticles may be the same ceramic, metal or metal alloy or a metal or metal alloy that diffuses into the build material powder particles, e.g., silver or gold nanoparticles may be used with gold alloy build material powder. Additional nonlimiting examples of nanoparticle material kind include AlN, SiC, $Si_3N_4$, WC, $Al_2O_3$, $Al(OH)_3$, $Fe_2O_3$, $Fe_3O_4$, MgO, $SiO_2$, $TiO_2$, $Y_2O_3$, ZnO, $ZrO_2$, $BaCO_3$, $In_2O_3$, $SnO_2$, carbon, magnesium, aluminum, iron, titanium, niobium, tungsten, chromium, tantalum, cobalt, nickel, vanadium, zirconium, molybdenum, palladium, platinum, copper, silver, gold, cadmium, zinc, and combinations of these with each other and/or with a nonmetallic element or elements.

The nanoparticle suspensions of the present invention may include more than one kind of nanoparticle material. For example, a nanoparticle suspension may include nanoparticles of both gold alloys and of silver alloys. Having more than one kind of nanoparticle material present is especially useful where it is desired to locally vary the composition of the built article and multiple print heads with different nanoparticle suspensions are used to print the nanoparticle suspensions during building of the article by the three-dimensional printing process.

In embodiments of the present invention which involve the use of the three-dimensional printing process, the build material powders may be of any type, size, and shape that are usable in the three-dimensional printing process. The build powders may be any ceramic, metal, metal alloy, or intermetallic compound that is usable with the three-dimensional printing process and to which the nanoparticles employed will bond at or below the relevant debile temperature range, for example, without limitation, powders of AlN, SiC, $Si_3N_4$, WC, $Al_2O_3$, $Al(OH)_3$, $Fe_2O_3$, $Fe_3O_4$, MgO, $SiO_2$, $TiO_2$, $Y_2O_3$, ZnO, $ZrO_2$, $BaCO_3$, $In_2O_3$, $SnO_2$, carbon, magnesium, aluminum, iron, titanium, niobium, tungsten, chromium, tantalum, cobalt, nickel, vanadium, zirconium, molybdenum, palladium, platinum, copper, silver, gold, cadmium, zinc, and combinations of these with each other and/or with a nonmetallic element or elements.

As their name suggests, the nanoparticles used in the practice of the present invention are particles with dimensions that are in the nanometer size range, that is, from about 1 nanometer to 1,000 nanometers. Preferably, the nanoparticles are in the size range of about 1 nanometers to about 100 nanometers, and more preferably within the range of about 1 to about 50 nanometers. The nanoparticles may have any shape. The nanoparticle material kind, size, and shape are chosen so that the nanoparticles bond to the build material powder particles to provide structural strength to the as-built article when the article is heated into its debile temperature range.

The nanoparticle suspensions of the present invention comprise the selected species of nanoparticles in a carrier fluid. The carrier fluid comprises a volatile liquid, i.e., a liquid that will substantially evaporate away within a practically reasonable time for the three-dimensional printing process after the suspension has been printed onto the build material. The amount of nanoparticles in the suspensions may be in the range of about 1 to about 50 weight percent. More preferably, the amount of nanoparticles in suspension is in the range of about 15 to about 30 weight percent. Higher amounts of nanoparticles in the suspensions lead to improved green densities. Without intending to be bound, the inventors believe that the increased green densities are attributable to the nanoparticles permeating with the suspension into the powder layer so that they become resident within the interstices between the powder particles.

Examples of such volatile liquids include, without limitation, water, toluene, alcohols (methanol, ethanol, propanol, etc.), and other organic solvents and liquids.

The carrier fluid portion of the nanoparticle suspensions of the present invention may further include one or more binders that are suitable for binding the build material particles together in the three-dimensional printing process. Although the inclusion of a binder is preferable, especially when only one nanoparticle suspension is being applied during the three-dimensional printing process, it is not always necessary. For example without limitation, when two or more nanoparticle suspensions are being applied during the three-dimensional printing process, a first nanoparticle solution containing a binder may be used to define the article's cross-sectional shape and a second nanoparticle solution having no binder may be applied to enhance the concentration of the nanoparticles or to locally vary the composition of the article being built.

Any binders suitable for use in the three-dimensional printing process for the selected build material powder may be used with the nanoparticle suspensions of the present invention. Because the nanoparticle present in the suspensions enhance the structural strength of the article during heating through the debile range, the present invention makes it possible in some cases to use a binder which, because of the lowness of the temperature at which it evaporates, degrades, or decomposes, previously has not been considered to be suitable for use for a given article geometry/build material combination. Nonlimiting examples of binders that may be used with the inventive suspensions include traditional binders such as polyvinyl alcohol (PVA), polyvinyl butyral (PVB), polyvinylpyrrolidone (PVP) and waxes. The concentration of the binder in a nanoparticle suspension is preferably within the range normally used for the three-dimensional printing process where nanoparticle-free binder solutions are printed, e.g., from about 5 to about 10 weight percent binder. When a binder or binders are used, it is preferred that the volatile liquid portion of the carrier fluid be a solvent for the binder or binders. Preferably, the binder leaves little or no residue in the article after it has volatilized and/or decomposed during heat treatment.

The nanoparticles should be well-dispersed within the inventive suspensions so as to avoid clogging the print head. As supplied from commercial sources, the nanoparticles in nanoparticle slurries usually are agglomerated to a substantial degree. The degree of particle dispersion affects the stability, uniformity, and the viscosity of the inventive suspensions. Generally speaking, a good dispersion of the nanoparticles decreases the suspension's viscosity, thus permitting higher solid-loading to be used during printing.

To achieve deagglomeration and good dispersion, it is beneficial to use a combination of mechanical force and ultrasonic vibration. Without desiring to be bound by the explanation, it is the opinion of the inventors that the mechanical force yields a global separation of the nanoparticles whereas the ultrasonic vibration causes more localized deagglomeration. Mechanical force can be applied by shaking, stirring, or rolling the container in which the nanoparticle suspension is contained. Ultrasonic vibrations may be applied by placing the container holding the nanoparticle suspension into a liquid bath within an ultrasonic vibration apparatus and applying ultrasonic vibrations to the bath. Generally speaking, the time needed for applying the mechanical vibrations than is longer than that needed for applying the ultrasonic vibrations. However, the time needed for either depends on the amount of agglomeration initially present in the suspension and the degree of dispersion desired.

Dispersants, also known as surfactants, especially those which have polar acid and/or hydroxyl functional ions or groups in a hydrocarbon chain, may be utilized in the present invention. Dispersants help the carrier fluid to wet the nanoparticles and/or aid in maintaining the nanoparticles in suspension in the carrier fluid. Without intending to be bound, the inventors believe that, during suspension, when dispersants having polar acid functional ions or groups are used, the polar acid of the dispersant can anchor chemically onto a hydrated nanoparticle surface and the remaining hydrocarbon chain can surround the nanoparticle, thus providing a polymeric stabilization method to prevent re-agglomeration. The type of dispersant to be used will depend on: (1) the nanoparticle material, size, and concentration; (2) the type of carrier fluid; and (3) if a binder or binders are used, the type and amount of the binder or binders. The choice to use a dispersant and the selection of the type and amount of dispersant also depends on the desired suspension stability time, i.e., the amount of time the nanoparticles are to stay suspended. In cases where the nanoparticle suspensions are to be used immediately after they are produced, very short stability times are necessary. However, where the nanoparticle suspensions are to be stored for later use, longer suspension stability times are necessary. Nonlimiting examples of dispersants that may be used in embodiments of the present invention include fatty acids, fish oil (a natural combination of fatty acids), glycols (diethylene glycol, proplylene glycol, ethylene glycol, polyethylene glycol, etc.) α-terpineol, ethylene glycol butyl ether, and propylene carbonate.

The fluid properties of a nanoparticle suspension of the present invention are to be adjusted, through the selection of the suspension's constituents and their amounts, to be compatible with the inkjet print head with which the suspension is to be used.

One or more print heads may be used during the three-dimensional printing process to print the nanoparticle suspension or suspensions onto the build material powder to build the article. Where a single nanoparticle suspension is to be used, it is preferred that a single print head be used. However, where nanoparticle suspensions differing in fluid components or nanoparticle material kind and/or size and/or loading amount are used to achieve local variations within the article being built, it is preferred that each nanoparticle suspension be printed from a separate print head. It is also possible to vary the local concentration of nanoparticles within the article being built by locally varying the amount of a nanoparticle suspension that is printed from a single print head. This can be done, for example without limitation, by adjusting the printing rate to deposit more of a nanoparticle suspension locally or by using multiple passes of the print head to deposit more nanoparticle suspension in one location than another.

After receiving a sintering heat treatment, articles made in accordance with the present invention may be subjected to conventional procedures such as infiltration with an infiltrant to fill in some of the porosity of the sintered article.

EXAMPLES

In the following examples, all percentages expressed denote weight percentages, unless otherwise indicated.

Example of Practicing the Present Invention

A slurry consisting of 30 nanometer silver nanoparticles in isopropyl alcohol was obtained from Ferro Electronic Materials Systems, South Plainfield, N.J., U.S. The slurry was dispersed into a carrier fluid consisting of water as the binder solvent, polyvinylpyrrolidone as the binder, and ethylene glycol monobutyl ether and ethylene glycol as dispersants to produce nanoparticle suspensions having 15%, 20%, 25%, and 30% silver weight loadings. Manual shaking, ultrasonic vibration, mechanical stirring, and mechanical rolling applied over an 8 to 10 hour period were used to achieve the desired degree of dispersion in the nanoparticle suspensions. Each of the nanoparticle suspensions was stable enough to produce no sedimentation noticeable to the naked eye after a week of standing undisturbed. The viscosities of the nanoparticle suspensions were measured at a shear rate of 150 seconds' and found to be approximately as follows (in centipoise): 6.8 for the 15% loading; 8.0 for the 20% loading; 9.5 for the 25% loading; and 12.5 for the 30% loading.

A three-dimensional printing process machine was used to make tensile test specimens. The three-dimensional printing process machine was the RX-1 model available from The Ex One Company, Irwin, Pa., US. The three-dimensional printing process machine had a drop-on-demand print head having 55 micrometer jet openings and a preferred jetted-fluid viscosity range of 6-10 centipoise. All of the suspensions were found to be printable, but the 25% and 30% loaded suspensions were more susceptible to print head clogging.

Thermogravimetric testing of the carrier fluid, both with and without the silver nanoparticle loading, revealed that binder removal occurred above 400° C. with the most significant amount of removal occurring between in the range of about 400 to 500° C.

Scanning electron microscopy revealed that the silver nanoparticles of the 20% loading sample nanoparticle suspension sintered together when heated at 300° C. for 15 minutes.

The build powder that was used was silver powder which had a particle size of 1.2 to 2.0 microns. The silver powder was obtained from Inframat Advanced Materials, Farmington, Conn., US. The as-received silver powder was baked at 100° C. for 1 hour to remove adsorbed moisture and then sieved through a 150 micron mesh opening screen and then through a 45 micron mesh opening screen to remove lumps.

Flat, dog-bone shaped tensile test specimens, as shown in FIG. 1, were made by three-dimensional printing the binder having a 20% nanoparticle silver suspension loading onto the silver powder. The as-printed tensile specimens were 50 millimeters in length with grip end widths of about 11 millimeters and neck widths of about 5 millimeters. Specimens were printed in two different thicknesses—1 and 2 millimeters. The volume of the thinner specimens was 0.375 cubic centimeters and that of the thicker specimens 0.75 cubic centimeters. The rectangular neck sections of the specimens where about 20 millimeters long. The print layer thickness used during three-dimensional printing was 25 microns. A 30 second heating period was used between each layer printing and a post-printing drying time of 30 minutes was employed prior to removing the tensile specimens from the powder bed. After the parts were printed, they were baked for 30 minutes at 120° C. to cure the binder. The printed parts were carefully removed from the powder bed.

Two different sinter cycles were used for heat treating the specimens. In sinter cycle A, the specimens were heated from room temperature at a rate of 10° C. per minute to a sintering temperature of 850° C., held at the sintering temperature for 20 minutes, and furnace cooled at a rate of 10° C. per minute to room temperature. Sinter cycle B was the same as sinter cycle A, except that a 30 minute dwell at 300° C. was interposed in the heat up portion of the sinter cycle.

Comparison Example

Comparison specimens were made using the same silver powder, same processing steps, and the same carrier fluid as described in the Example of the present invention, but without the nanoparticle silver in suspension in the carrier fluid.

Evaluation of Specimens from the Examples

The sintered specimens that were made in the Example and the Comparison Example were evaluated by (1) green density measurements, (2) visual observation for sintered distortion, (3) sintered density measurement, and (4) tensile strength testing.

The specimens made according to the present invention had an average green density of 2.184 grams per cubic centimeter (with an estimated standard error of 0.024 grams per cubic centimeter) whereas the Comparison Example specimens had an average green density of 2.116 grams per cubic centimeter (with an estimated standard error of 0.033 grams per cubic centimeter). Without wishing to be bound, the inventors attribute the higher green density of the specimens made according to the present invention to interspersing of the silver nanoparticles within the interstices between the silver powder particles.

Figure 2:
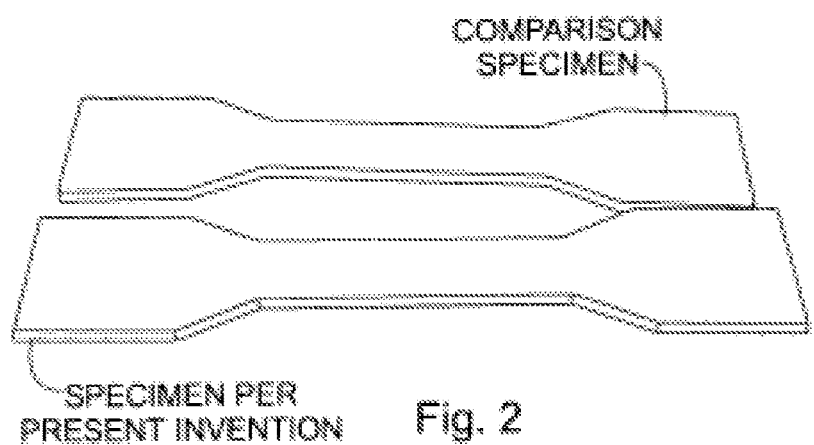
FIG. 2 is a photograph showing specimens discussed in the Examples made by the three-dimensional printing process, which are in the sintered state (sinter cycle A) and had an as-printed thickness of 1.0 millimeters.

Referring to FIG. 2, a sintered specimen which was made according to the present invention in the Example described above is shown along with a sintered Comparison Example specimen. Both samples were sintered using sinter cycle A. These sintered specimens had printed thicknesses of 1.0 millimeters and sintered thicknesses of 0.68 and 0.66 millimeters, respectively. As is evident from FIG. 2, the specimen which was made according to the present invention is flat and well defined, whereas the Comparison Example specimen which was made without the use of the nanoparticle suspension is warped and experienced more longitudinal shrinkage. The sintered specimens which were made according to the present invention also were observed to have sharper corners and edges than did the sintered Comparison Example samples.

Figure 3:
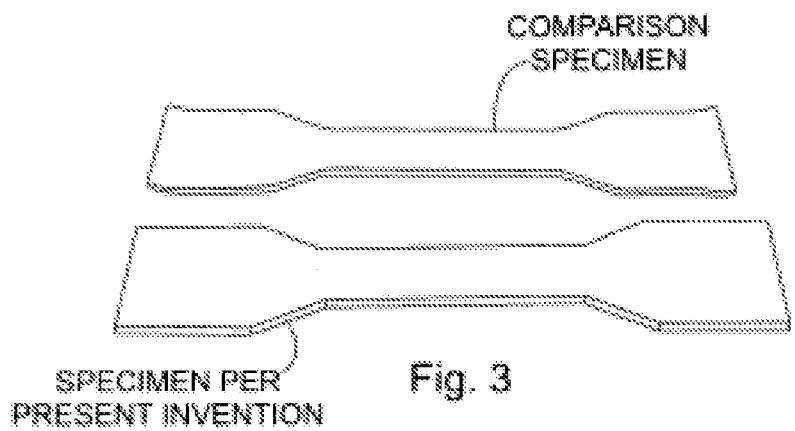
FIG. 3 is a photograph showing specimens discussed in the Examples made by the three-dimensional printing process, which are in the sintered state (sinter cycle B) and had an as-printed thickness of 1.0 millimeters.

Referring to FIG. 3, a sintered specimen which was made according to the present invention in the Example described above is shown along with a sintered Comparison Example specimen. Both samples were sintered using sinter cycle B. These sintered specimens had printed thicknesses of 1.0 millimeters and sintered thicknesses of 0.68 and 0.66 millimeters, respectively. As is evident from the FIG. 3, the midsection of the Comparison Example specimen bowed upward during sintering while that of the specimen which was made according to the present invention remained flat.

Figure 4:
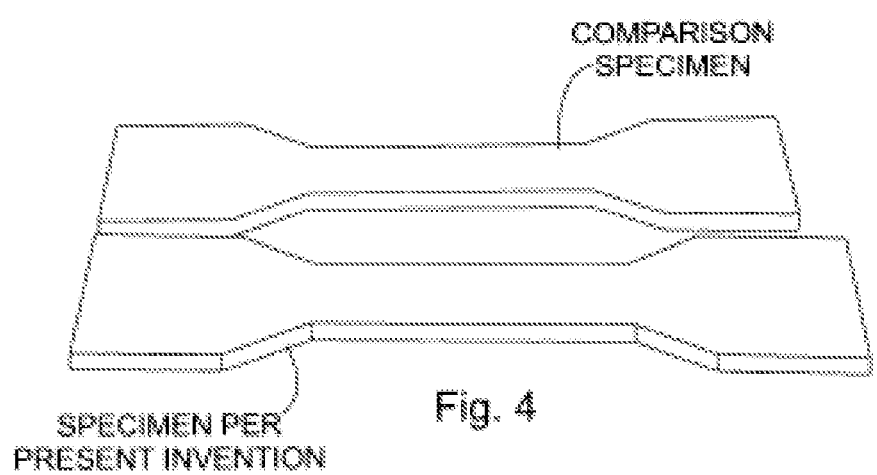
FIG. 4 is a photograph showing specimens discussed in the Examples made by the three-dimensional printing process, which are in the sintered state (sinter cycle A) and had an as-printed thickness of 2.0 millimeters.

Referring to FIG. 4, a sintered specimen which was made according to the present invention in the Example described above is shown along with a sintered Comparison Example specimen. Both samples were sintered using sinter cycle A, but here both of the specimens had a printed thickness of 2.0 millimeters, instead of the 1.0 millimeters for the specimens shown in FIGS. 1 and 2. The sintered thickness of the specimen which was made according to the present invention was 1.35 millimeters while that of the Comparison Example was 1.27 millimeters. It is evident from the FIG. 4, that the Comparison Example experienced corner warping and greater longitudinal shrinkage than did the specimen made according to the present invention.

The average sintered density of the specimens which were made according to the present invention was 88.9% whereas the average sintered density of the Comparison Example specimens was just 87.1%.

Figure 5:
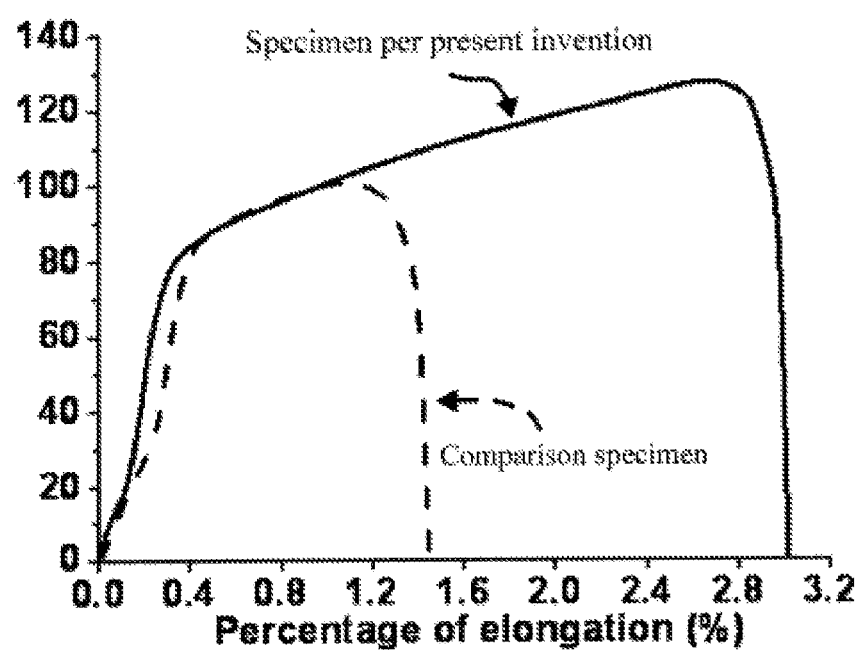
FIG. 5 is a representation of a graph showing the tensile test results of specimens discussed in the Examples.

Tensile tests conducted on the sintered specimens revealed that the specimens which were made according to the present invention had significantly higher tensile strengths and ductilities than did the Comparison Example specimens. FIG. 5 shows a comparison of the tensile test results. The specimens which were made according to the present invention, on the average, broke at a load of 128 newtons whereas the Comparison Example specimens, on the average, broke at a load of only 100 newtons. The specimens which were made according to the present invention had an average longitudinal elongation of 3.0% at fracture versus only 1.4% for the Comparison Example specimens. The average engineering tensile strength of the specimens which were made according to the present invention was 55 megapascals versus only 46 megapascals for the Comparison Example specimens.

The foregoing test results demonstrate that the use of a nanoparticle suspension in accordance with the present invention in the three-dimensional printing process to make articles having thin dimensions and high aspect ratios resulted in sharper features and less distortion after sintering, higher sintered densities, and superior mechanical strength and ductilities compared with the same articles made in the same way, but without the nanoparticle suspension. These results clearly show that use of a nanoparticle suspension according to the present invention enhances the structural strength of the three-dimensional printed article during the sinter heat treatment.

While only a few embodiments of the present invention have been shown and described, it will be obvious to those skilled in the art that many changes and modifications may be made thereunto without departing from the spirit and scope of the invention as described in the following claims. All United States patents and patent applications, all foreign patents and patent applications, and all other documents identified herein are incorporated herein by reference as if set forth in full herein to the full extent permitted under the law.

What is claimed is:

1. A method of three-dimensional printing comprising the steps of:
   (a) spreading a layer of build material powder particles;
   (b) selectively printing a first fluid onto the layer of the build material powder particles, the first fluid comprising a first polymeric binder, a first carrier liquid, and a first group of nanoparticles, wherein the first polymeric binder is dissolved in the first carrier liquid;
   (c) repeating the steps (a) and (b) for additional layers of the build material powder particles to create a preselected object; and
   (d) heat-curing the polymeric binder contained within the object, wherein the nanoparticles of the first group of nanoparticles form interparticle bonds between the build material powder particles during the heat-curing to provide structural strength to the object when the object is heated into its debile temperature range.

2. The method of claim 1, wherein the step (b) further comprises selectively printing a second fluid onto the layers of the build material powder particles, the second fluid comprising a second carrier liquid and a second group of nanoparticles.

3. The method of claim 2, wherein the second fluid also comprises a second polymeric binder, wherein the second polymeric binder is dissolved in the second carrier liquid.

4. The method of claim 3, wherein at least one of the first polymeric binder and the second polymeric binder comprises at least one selected from the group consisting of polyvinyl alcohol (PVA), polyvinyl butyral (PVB), polyvinylpyrrolidone (PVP), and a wax.

5. The method of claim 1, wherein the first fluid also includes a first dispersant.

6. The method of claim 5, wherein the first dispersant comprises at least one selected from the group consisting of a fatty acid, fish oil, diethylene glycol, propylene glycol, ethylene glycol, polyethylene glycol, α-terpineol, and ethylene glycol butyl ether.

7. The method of claim 2, wherein the second fluid also includes a second dispersant.

8. The method of claim 7, wherein the second dispersant comprises at least one selected from the group consisting of a fatty acid, fish oil, diethylene glycol, propylene glycol, ethylene glycol, polyethylene glycol, α-terpineol, and ethylene glycol butyl ether.

9. The method of claim 1, wherein the step (b) includes selectively depositing the first fluid in locally varying amounts so as to locally vary a concentration of the nanoparticles of said first group of nanoparticles within said article.

10. The method of claim 1, wherein the build material powder particles include at least one selected from the group consisting of a ceramic, a metal, a metal alloy, and an intermetallic compound.

11. The method of claim 1, wherein the build material powder particles include at least one selected from the group consisting of AlN, SiC, $Si_3N_4$, WC, $Al_2O_3$, $Al(OH)_3$, $Fe_2O_3$, $Fe_3O_4$, MgO, $SiO_2$, $TiO_2$, $Y_2O_3$, ZnO, $ZrO_2$, $BaCO_3$, $In_2O_3$, $SnO_2$, carbon, magnesium, aluminum, iron, titanium, niobium, tungsten, chromium, tantalum, cobalt, nickel, vanadium, zirconium, molybdenum, palladium, platinum, copper, silver, gold, cadmium, zinc, and combinations of these with each other and/or with a nonmetallic element or elements.

12. The method of claim 2, wherein the material type of the nanoparticles of at least one of the first group of nanoparticles and the second group of nanoparticles is selected from the group consisting of AlN, SiC, $Si_3N_4$, WC, $Al_2O_3$, $Al(OH)^3$, $Fe_2O_3$, $Fe_3O_4$, MgO, $SiO_2$, $TiO_2$, $Y_2O_3$, ZnO, $ZrO_2$, $BaCO_3$, $In_2O_3$, $SnO_2$, carbon, magnesium, aluminum, iron, titanium, niobium, tungsten, chromium, tantalum, cobalt, nickel, vanadium, zirconium, molybdenum, palladium, platinum, copper, silver, gold, cadmium, zinc, and combinations of these with each other and/or with a nonmetallic element or elements.

13. The method of claim 1, further comprising a step (e) further heating the article to transform the article into a sintered article.

14. The method of claim 13, wherein the sintered article has porosity and further comprising a step (f) infiltrating the sintered article with a hardenable infiltrant to fill in at least some of the porosity of the sintered article.

* * * * *